May 7, 1957 G. C. WHEELER 2,791,434
TURTLE WHEEL-TOY
Filed May 5, 1955

INVENTOR.
GEORGE C. WHEELER
BY R. W. Hodgson
ATTORNEY

United States Patent Office 2,791,434
Patented May 7, 1957

2,791,434

TURTLE WHEEL-TOY

George C. Wheeler, Highland, Calif.

Application May 5, 1955, Serial No. 506,189

3 Claims. (Cl. 280—1.22)

Generally speaking, the present invention relates to the wheel-toy art, and more particularly pertains to a wheel-toy, suitable for a child to ride upon, in the semblance of a turtle or similar quadruped reptile and closely imitating the motion of such a reptile.

I am aware that many wheel-toys in the semblance of animals have been previously invented and developed. However, no such prior wheel-toys, known to me, have had the advantage of accurately or inexpensively simulating the general appearance, the motion, and the leg-movements of a turtle, or similar reptile. Especially since many zoos have provided Galapagos tortoises on which children are permitted to ride, the idea of riding on such a beast, or a semblance thereof, has become highly attractive to children—and turtles in general have always had an attraction for children.

Generally speaking, the device of the present invention comprises a simulated body of a quadruped reptile; seating means cooperable therewith to permit a child to ride comfortably on the top of said simulated body; rollable means cooperable with said simulated body to permit it to rollably progress with a motion like that of a reptile; and leg means cooperable with said simulated body and said rollable means to move, as the device progresses, in a manner highly imitative of reptilian leg-movement.

The present invention is particularly suited for simulating creatures such as the turtle whose bodies hug the ground as they move—so that the wheels and associated apparatus are properly concealed. The body, in certain forms of the invention, may be modified to resemble an alligator or similar creature without requiring serious modification of the structures previously described.

While in some forms of the invention said seating means is simply the top of the device, in a preferred general form it consists of seat means and associated foothold and/or handhold means to allow comfortable and safe riding as the device is pushed of drawn.

From the above description of the basic form and various preferred forms of the present invention, it will be apparent to those skilled in the art that the present invention has many advantages over prior art devices— especially in that it achieves verisimilitude of movement with a linkage which is extremely simple and inexpensive of manufacture.

Therefore, it is an object of the present invention to provide a wheel-toy simulating a reptile in appearance and movement, and adapted for a child to ride thereon.

It is also an object of the present invention to provide a reptile-simulating wheel-toy whose four legs move in a highly lifelike manner through the operation of a simply constructed linkage.

It is a further object of the present invention to provide a wheel-toy, suited for a child to ride upon, which in appearance, bodily movement and leg movement closely imitates a turtle.

Other and allied objects of the present invention will occur to those skilled in the art after a careful perusal of the present specification, the accompanying illustrations, and the appended claims. To facilitate understanding, reference will be made to the hereinabove-described drawings, in which:

Figure 1:
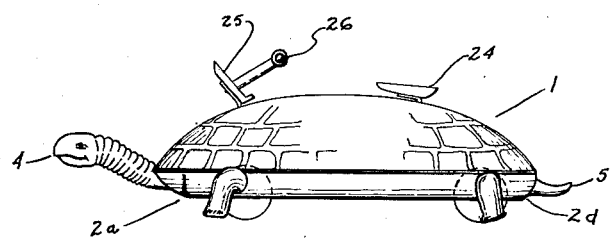
Fig. 1 is an elevational view of a preferred form of the device of the present invention.
Figure 3:
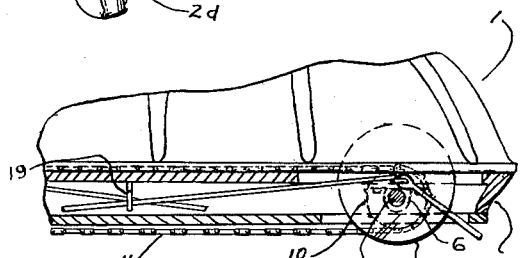
Fig. 3 is an enlarged fragmentary view (with the upper portion in elevation and the lower portion in section, as indicated by the arrows III—III) of the device of Fig. 2, with various parts invisible from this vantage being indicated by broken lines.
Figure 2:
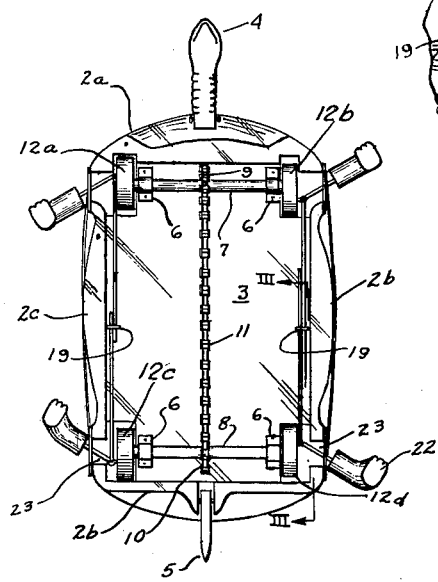
Fig. 2 is a bottom plan view of the device of Fig. 1 with the bottom closure plate removed for clarity and with the rollable means (and the leg means) positioned as they would be after forward movement of the entire device a distance corresponding to approximately ¾ revolutions of each of the rollable means.
Figure 4:
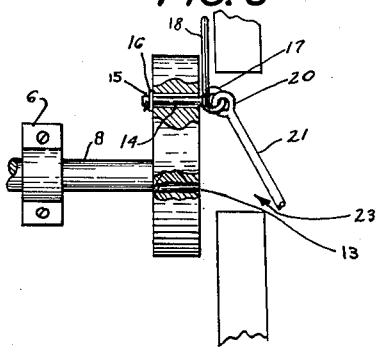
Fig. 4 is a detail of portions of the left rear rollable means and leg means of the device of Figs. 1 and 2.
Figure 5:
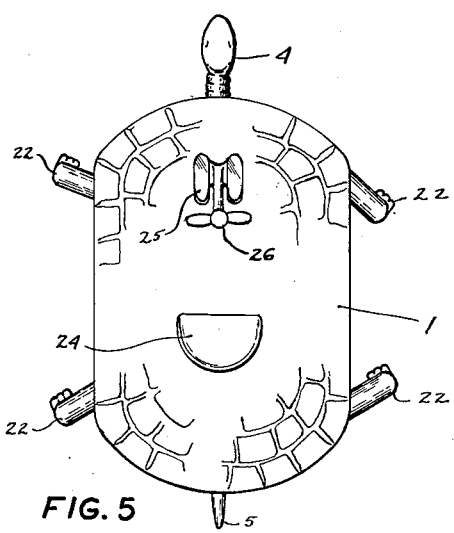
Fig. 5 is a top plan view of the device of Figs. 1 and 2.

The illustrated form of the present invention is a turtle-simulating device. The body includes upper shell means 1 and lower shell means whose front portion is indicated at 2a, two side portions at 2b and 2c (left and right sides respectively from the vantage point of one riding on the device), and back portion at 2d. The base plate 3 is attached at the juncture of the upper shell means with the lower. Attached to the lower shell means are the turtle-head simulating member 4, and the turtle-tail simulating member 5, which may be flexibly and resiliently attached to provide verisimilitude. Attached to the base plate 3 are bearings 6, in which the front axle 7 and rear axle 8 are rotatably mounted. Attached to the axles (fixedly) are the sprockets 9 and 10, over which pass the sprocket chain 11; since the two sprockets are of the same size and each has the same number of teeth, the two axles are thus kept in a constant angular-phase relationship with respect to each other as the axles rotate. The four eccentrically-mounted wheels are indicated at 12a (front right), 12b (front left) 12c (rear right) and 12d (rear left). Each is held irrotatably on the axle by a spline as shown at 13. Note that the angular phases at 12a and 12d are similar and at approximately a 180° phase angle from those of 12b and 12c.

With each wheel is associated a pin 14, which is free to rotate in a bearing-hole 15 (eccentrically located) in the wheel, being retained by a washer 16. At the outer end of the pin is the "second" eye 17, and a positioning member 18 is fixedly attached at a right angle to the pin. This member 18 passes through a ring 19 mounted on the base plate. Engaging the "second" eye is the "first" eye 20 at the "second" end of lever-rod 21. At the "first" end of lever-rod 21 is attached a foot-simulating member such as 22. The lever-rod cooperates with a rectangular opening in the lower shell means as shown at 23, thus giving the attached foot-simulating member a natural-appearing motion as the wheels rotate.

In the illustrated form, a seat 24, and a foot-hold 25 and a hand-hold 26 are provided on the upper shell to allow a child to ride safely thereon as the device is pushed or pulled over the ground. A cord with which to pull the device may be attached at the foot-hold or at some other convenient point on the device.

Numerous modifications and variations of the present invention will occur to those skilled in the art after a careful study hereof. All such, properly within the basic scope and/or teachings of the present invention are intended to be included and comprehended herein as fully as if specifically described, illustrated and claimed herein.

For instance, it is clear that the body seating means, and leg-simulating means may be modified (also, the phase relationships of the wheels and legs may be changed) so that the device simulates various different types of turtles, tortoises, alligators, and other quadruped reptiles of the "ground-hugging" sort.

The exact compositions, configurations, relative positionings and cooperative relationships of the various component parts of the present invention are not critical, and may be modified substantially within the basic teachings, spirit and scope of the present invention.

The embodiment of the present invention specifically described, illustrated and claimed herein is exemplary only, and is not intended to limit the scope of the present invention, which is intended to be interpreted in the light of the prior art and the appended claims only, with due consideration for the doctrine of equivalents.

I claim:

1. A wheel-toy, suited for a child to ride upon, simulating the appearance and motion of a quadruped reptile, comprising: reptile-simulating body means; seating means cooperable with said body means to permit a child to ride comfortably thereon; rollable means cooperable with said body means to permit the rollable progression of the wheel-toy with a reptile-like motion; leg means cooperable with said body means and said rollable means to move, as the wheel-toy progresses, in a manner imitative of reptilian leg-movements; said body means defining an underlying spatial region; said rollable means lying generally within said spatial region and including front and rear axle means rotatably mounted on said body means in supporting relationhip thereto, sprocket means fixedly mounted on said axle means, sprocket chain means cooperable with said sprocket means to rotatably link said front axle means to said rear axle means, and four wheel means eccentrically fixedly mounted on said axle means in supporting relationship thereto and in rollable relationship to the ground, whereby a rolling, rocking, and swaying motion may be imparted to the body means as the wheel-toy progresses; said leg means including four individual legs; each of said legs including a visible foot-simulating member lying generally outside said spatial region, and, generally within said spatial region, including a lever-rod having a first end attached fixedly to said member and a second end provided with first eye means, pin means rotatably engaged with one of said wheel means with axis eccentric thereto and virtually parallel to said axle means, second eye means formed by said pin means and interlinked with said first eye means, and angular position-limiting means cooperating with said body means to limit the angular position of said second eye means with respect to the body means; said body means having four lateral aperture means, each of which communicates with said spatial region and through each of which, cooperable therewith, one of said lever-rods passes, whereby a natural and lifelike motion is imparted to said foot-simulating members.

2. A wheel-toy, suited for a child to ride upon, simulating the appearance and motion of a turtle, comprising: turtle-simulating body means; seating means cooperable with said body means to permit a child to ride comfortably thereon; rollable means cooperable with said body means to permit the rollable progression of the wheel-toy with a turtle-like rocking and swaying motion of the body means; leg means cooperable with said body means and said rollable means to move, as the wheel-toy progresses, in a manner imitative of the leg movements of a turtle; said body means defining an underlying spatial region; said rollable means lying generally within said spatial region and including front and rear axle means rotatably mounted on said body means in supporting relationship thereto, sprocket means fixedly mounted on said axle means, sprocket chain means cooperable with said sprocket means to rotatably link said front axle means to said rear axle means, and four wheel means eccentrically fixedly mounted on said axle means in supporting relationship thereto and in rollable relationship to the ground, whereby a rolling, rocking, and swaying motion may be imparted to the body means as the wheel-toy progresses; said leg means including four individual legs; each of said legs including a visible foot-simulating member lying generally outside said spatial region, and, generally within said spatial region, including a lever-rod having a first end attached fixedly to said member and a second end provided with first eye means, pin means rotatably engaged with one of said wheel means with axis eccentric thereto and virtually parallel to said axle means, second eye means formed by said pin means and interlinked with said first eye means, and angular position-limiting means cooperating with said body means to limit the angular position of said second eye means with respect to the body means; said body means having four lateral aperture means, each of which communicates with said spatial region and through each of which, cooperable therewith, one of said lever-rods passes, whereby a natural and lifelike motion is imparted to said foot-simulating members.

3. A wheel-toy, suited for a child to ride upon, simulating the appearance and motion of a turtle, comprising: turtle-simulating body means; including upper shell means and lower shell means; seating means cooperable with said upper shell means to permit a child to ride comfortably thereon; rollable means cooperable with said bodys means to permit the rollable progression of the wheel-toy with a turtle-like rocking and swaying motion of the body means; leg means cooperable with said body means and said rollable means to move, as the wheel-toy progresses, in a manner imitative of the leg movements of a turtle; said body means defining an underlying spatial region beneath said upper shell means and encompassed by said lower shell means; said rollable means lying generally within said spatial region and including front and rear axle means rotatably mounted on said body means in supporting relationship thereto, sprocket means fixedly mounted on said axle means, sprocket chain means cooperable with said sprocket means to rotatably link said front axle means to said rear axle means, and four wheel means eccentrically fixedly mounted on said axle means in supporting relationship thereto and in rollable relationship to the ground, whereby a rolling, rocking, and swaying motion may be imparted to the body means as the wheel-toy progresses; said leg means including four individual legs; each of said legs including a visible foot-simulating member lying generally outside said spatial region, and, generally within said spatial region, including a lever-rod having a first end attached fixedly to said member and a second end provided with first eye means, pin means rotatably engage with one of said wheel means with axis eccentric thereto and virtually parallel to said axle means, second eye means formed by said pin means and interlinked with said first eye means, and angular position-limiting means cooperating with said body means to limit the angular position of said second eye means with respect to the body means; said lower shell means having four lateral aperture means, each of which communicates with said spatial region and through each of which, cooperable therewith, one of said lever-rods passes, whereby a natural and lifelike motion is imparted to said foot-simulating members.

References Cited in the file of this patent

UNITED STATES PATENTS

| | | |
|---|---|---|
| 862,015 | Pittman | July 30, 1907 |
| 1,449,163 | Brandes | Mar. 20, 1923 |
| 1,498,427 | Dean | June 27, 1924 |
| 1,788,798 | Lesot | Jan. 13, 1931 |
| 2,539,640 | Sebel | Jan. 30, 1951 |

FOREIGN PATENTS

| | | |
|---|---|---|
| 612,912 | France | Aug. 10, 1926 |